US010433647B2

(12) United States Patent
Jibiki et al.

(10) Patent No.: US 10,433,647 B2
(45) Date of Patent: Oct. 8, 2019

(54) VEHICLE SEAT

(71) Applicant: TACHI-S CO., LTD., Tokyo (JP)

(72) Inventors: Ippei Jibiki, Tokyo (JP); Kazuyoshi Arata, Tokyo (JP)

(73) Assignee: TACHI-S CO., LTD., Tokyo (JP)

( * ) Notice: Subject to any disclaimer, the term of this patent is extended or adjusted under 35 U.S.C. 154(b) by 0 days.

(21) Appl. No.: 15/689,504

(22) Filed: Aug. 29, 2017

(65) Prior Publication Data
US 2018/0070731 A1 Mar. 15, 2018

(30) Foreign Application Priority Data

Sep. 15, 2016 (JP) .................................. 2016-180769

(51) Int. Cl.
| | |
|---|---|
| *B60N 2/56* | (2006.01) |
| *B60N 2/68* | (2006.01) |
| *B60N 2/70* | (2006.01) |
| *A47C 7/74* | (2006.01) |
| *A47C 7/20* | (2006.01) |
| *B60H 1/00* | (2006.01) |
| *B60N 2/58* | (2006.01) |

(Continued)

(52) U.S. Cl.
CPC .................. *A47C 7/74* (2013.01); *A47C 7/20* (2013.01); *B60N 2/5621* (2013.01); *B60N 2/5657* (2013.01); *B60N 2/58* (2013.01); *B60N 2/686* (2013.01); *B60N 2/7094* (2013.01); *B60N 2/72* (2013.01); *B60H 1/00* (2013.01); *B60N 2/502* (2013.01)

(58) Field of Classification Search
CPC .......... A47C 7/74; A47C 7/20; B60N 2/5621; B60N 2/5657; B60N 2/58; B60N 2/7094; B60N 2/72; B60N 2/502; B60H 1/00
USPC ....... 248/565, 566, 567, 576, 582, 617, 618, 248/632, 633, 634; 297/216.1, 216.12, 297/216.13, 391, 452.1, 452, 42, 452.18, 297/463.1, 180.13, 180.14; 254/120
See application file for complete search history.

(56) References Cited

U.S. PATENT DOCUMENTS

| | | | |
|---|---|---|---|
| 6,848,742 B1 * | 2/2005 | Aoki .................... | B60N 2/5635 297/180.14 |
| 2003/0102699 A1 * | 6/2003 | Aoki .................. | B60H 1/00285 297/180.14 |

(Continued)

FOREIGN PATENT DOCUMENTS

JP 2003-165325 A 6/2003

*Primary Examiner* — Tan Le
(74) *Attorney, Agent, or Firm* — Westerman, Hattori, Daniels & Adrian, LLP (57) ABSTRACT

A plurality of first spring members is each disposed to bridge between a back frame and a first support member, and a blower unit is disposed on an opposite side to a cushion member side on the first support member. Second spring members and third spring members are each disposed to bridge between a cushion frame and a second support member, and a blower unit is disposed on an opposite side to a cushion member side on the second support member. Then, the blower units ensure being supported to the spring members without overlapping of the support members and the blower units on the spring members in a thickness direction of a seat back or a seat cushion. This ensures a space in the thickness direction of the seat back or the seat cushion to be efficiently used.

11 Claims, 7 Drawing Sheets

(51) Int. Cl.
*B60N 2/72* (2006.01)
*B60N 2/50* (2006.01)

(56) References Cited

U.S. PATENT DOCUMENTS

| | | | | |
|---|---|---|---|---|
| 2006/0138812 A1* | 6/2006 | Aoki | ............... | B60N 2/5635 |
| | | | | 297/180.14 |
| 2006/0290176 A1* | 12/2006 | Aoki | ............... | B60N 2/5628 |
| | | | | 297/180.1 |
| 2010/0066149 A1* | 3/2010 | Andersson | ......... | B60N 2/0232 |
| | | | | 297/463.1 |
| 2012/0261974 A1* | 10/2012 | Yoshizawa | ......... | B60N 2/5642 |
| | | | | 297/452.42 |
| 2016/0009210 A1* | 1/2016 | Sasaki | ............. | B60N 2/5657 |
| | | | | 297/180.13 |

* cited by examiner

VEHICLE SEAT

TECHNICAL FIELD

The present invention relates to vehicle seats, especially, to a vehicle seat configured to efficiently use a space in a thickness direction of a seat back or a seat cushion.

BACKGROUND ART

There has been known a technique on a vehicle seat where spring members are installed on a frame of a seat back or a seat cushion to support a blower unit that includes a blower and a duct coupled to the blower. For example, Patent Literature 1 discloses a technique where seat springs 28 support a blower case 30 in a state where the seat springs 28 are interposed between a bracket 37 and seatings 35.

CITATION LIST

Patent Literature

[Patent Literature 1] JP-A No. 2003-165325 (For example, Paragraph 0061, FIG. 5)

SUMMARY OF INVENTION

Technical Problem

However, in the above conventional technique, the bracket 37, the seat springs 28, and the blower case 30 (the seatings 35) overlap in a thickness direction of the seat back or the seat cushion, thus increasing the thickness. Accordingly, there has been a problem that a space in the thickness direction of the seat back or the seat cushion fails to be efficiently used.

The present invention has been made to solve the above-described problem, and it is an object of the present invention to provide a vehicle seat configured to efficiently use a space in a thickness direction of a seat back or a seat cushion.

Solution to Problem and Advantageous Effects of Invention

A plurality of spring members is each disposed to bridge between a frame and a support member, and a blower unit is disposed on an opposite side to a cushion member side on the support member. Then, the blower unit is ensured being supported by the spring member without overlapping of the support member and the blower unit on the spring member in the thickness direction of the seat back or the seat cushion. Accordingly, the effect is provided such that the space in the thickness direction of the seat back or the seat cushion can be efficiently used.

Further, the spring member can be omitted to dispose on a region where the support member and the blower unit are disposed. Accordingly, the effect is provided such that the number of components is decreased to ensure reducing the product cost of the vehicle seat.

Further, the support member is made of resin material and formed into a flat plate shape. Then, the support member ensures being bent along deformation of the cushion member when the cushion member is deformed due to a load of a seated person. Accordingly, even when the spring member is omitted in the region where the support member and the blower unit are disposed, the effect is provided such that seating comfort of the vehicle seat can be improved.

Further, the support member includes a protruding portion and a coupling portion, the protruding portion is formed projecting to the spring member side from an outer edge of the support member, and the coupling portion is formed on a projecting end side of the protruding portion and rotatably coupled to an outer peripheral surface of the spring member. Then, when the support member is bent due to the load of the seated person, the coupling portion rotates around the spring member in accordance with the bending. In this case, since the protruding portion, on which the coupling portion is formed, is formed projecting from an outer edge of the support member to the spring member side, the protruding portion is formed to have rigidity lower than rigidity of a center side of the support member. That is, the protruding portion is formed with the low rigidity to be easily bent, and formed rotatable around the spring member by the coupling portion. Then, the support member is easily bent along the deformation of the cushion member. Accordingly, the effect is provided such that the seating comfort of the vehicle seat is improved.

The support member includes an opening portion opened passing through in a thickness direction of the support member, and the opening portion holds an end portion of the duct on an opening side of the duct. Then, the opening of the duct is restricted to project to the cushion member side from the support member. Accordingly, the cushion member can be formed to be thick by an amount of not projecting of the opening of the duct to the cushion member side, thus providing the effect for improving the seating comfort of the vehicle seat.

The duct includes a flange portion that projects out into a flange shape from a distal end on the opening side of the duct, the flange portion is locked to the opening portion, and the flange portion is disposed on the cushion member side on the support member. Then, applying the load of the seated person on the cushion member causes the cushion member to press the flange portion to the support member side (the flange portion is sandwiched between the cushion member and the support member).

Accordingly, when the support member is bent due to the deformation of the cushion member, the effect is provided such that the duct (the flange portion) is prevented from coming off from the opening portion. Further, even when the support member is bent, adhesion between the cushion member and the flange portion can be increased, thus providing the effect for enhancing the efficiency of air conditioning.

A plurality of spring members is each disposed to bridge between a frame and a support member, and a blower unit is disposed on an opposite side to a cushion member side on the support member. Then, the blower unit is ensured being supported by the spring member without overlapping of the support member and the blower unit on the spring member in the thickness direction of the seat back or the seat cushion. Accordingly, the effect is provided such that the space in the thickness direction of the seat back or the seat cushion can be efficiently used.

Further, the support member is made of resin material and formed into a flat plate shape. Then, the support member ensures being bent along deformation of the cushion member when the cushion member is deformed due to a load of a seated person. Accordingly, even when the spring member is omitted in the region where the support member and the blower unit are disposed, the effect is provided such that seating comfort of the vehicle seat can be improved.

Further, the support member includes a pair of guiding portions that are disposed upright on a surface of an opposite side to the cushion member and disposed to extend on a straight line, and the blower includes a sliding portion configured to be slidably movable with respect to the pair of the guiding portions. Then, the sliding portion of the blower can be slidably inserted between the pair of the guiding portions of the support member.

In this case, at least one of the support member and the blower includes first restricting portion that restricts the slide move of the blower in a direction in which the blower is inserted between the pair of the guiding portions. Then, the sliding portion of the blower is slidably inserted between the pair of the guiding portions of the support member, thus performing positioning of the blower in the insertion direction by the first restricting portion. Accordingly, the effect is provided such that the blower unit can be easily mounted to the support member.

At least one of the support member and the blower includes second restricting portion that restricts the slide move of the blower in a direction in which the blower is pulled out of the pair of the guiding portions. Then, the blower inserted between the pair of the guiding portions is held in the inserted state by the second restricting portion. That is, the blower is secured to the support member in a state where the slide moves in both directions of the insertion direction between the pair of the guiding portions and the opposite direction to the insertion direction are restricted by the first restricting portion and the second restricting portion. Accordingly, the effect is provided such that the blower is prevented from dropping off the pair of the guiding portions.

The pair of the guiding portions are intermittently formed along an extending direction of the pair of the guiding portions. Then, the rigidity of the support member can be decreased compared with a case where the pair of the guiding portions are continuously formed along the extending direction. Accordingly, the support member is easily bent along the deformation of the cushion member, thus providing the effect for improving the seating comfort of the vehicle seat.

At least one of the pair of the guiding portions and the blower includes a rubber elastic body interposed between the pair of the guiding portions and the sliding portion. Then, the rubber elastic body attenuates vibration of the blower, thus inhibiting the vibration to be transmitted to the support member. Accordingly, the vibration of the blower is inhibited from being transmitted to the seated person via the support member, thus providing the effect for improving the seating comfort of the vehicle seat.

The support member includes a slit portion formed to be depressed or pass through in a thickness direction of the support member. Then, the rigidity of the support member can be decreased in a region where the slit portion is formed. Accordingly, the support member is easily bent along the deformation of the cushion member, thus providing the effect for improving the seating comfort of the vehicle seat.

The slit portion is formed on an outer edge side of the support member with respect to a region where the pair of the guiding portions are disposed. Then, the rigidity of the support member can be decreased on the outer edge side with respect to the region where the pair of the guiding portions are disposed while the rigidity of the support member is maintained in the region where the pair of the guiding portions are disposed.

Then, while an influence of the deformation of the support member on the pair of the guiding portions is reduced, the deformability of the support member is ensured on the outer edge side with respect to the region where the pair of the guiding portions are disposed. Accordingly, the effect is provided such that the seating comfort of the vehicle seat can be improved while preventing the blower from dropping off the pair of the guiding portions.

The slit portion is formed in a region surrounded by the pair of the guiding portions. Then, the rigidity of the support member can be decreased in the region surrounded by the pair of the guiding portions. Accordingly, even when the pair of the guiding portions are formed on the support member, and the blower is secured to the pair of the guiding portions, the support member is easily bent along the deformation of the cushion member, thus providing the effect for improving the seating comfort of the vehicle seat.

The blower is disposed separately from the support member. Then, the support member is allowed to be bent to the blower side. Accordingly, the support member is easily bent along the deformation of the cushion member, thus providing the effect for improving the seating comfort of the vehicle seat.

DESCRIPTION OF EMBODIMENTS

Figure 1:
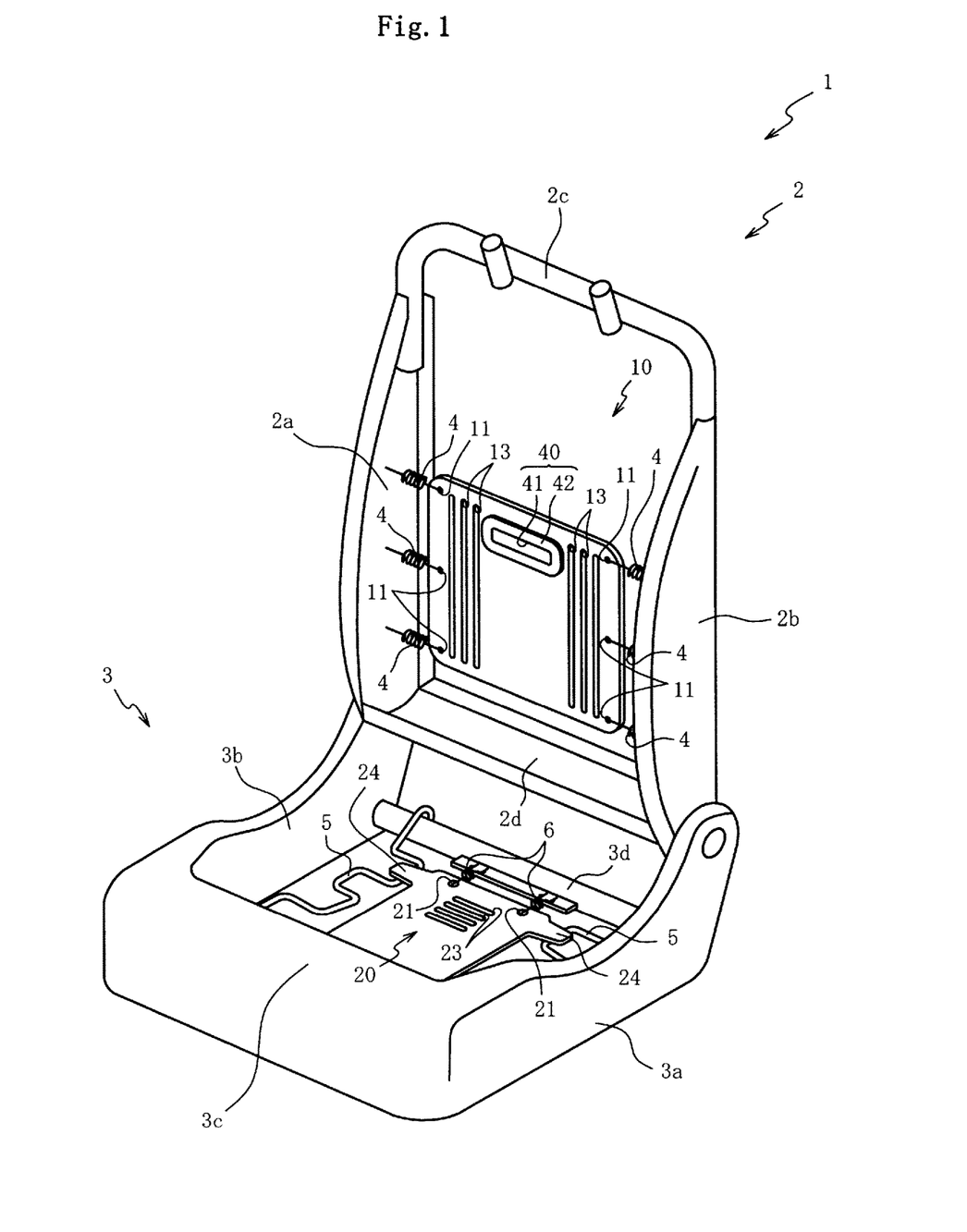
FIG. 1 is a perspective view of a vehicle seat according to one embodiment of the present invention.

The following describes preferred embodiments of the present invention with reference to the accompanying drawings. First, a description will be given of an overall configuration of a vehicle seat 1 with reference to FIG. 1. FIG. 1 is a perspective view of the vehicle seat 1 according to one embodiment of the present invention. In FIG. 1, a part of the vehicle seat 1 is omitted to be indicated schematically.

As illustrated in FIG. 1, the vehicle seat 1 is a seat mounted on a vehicle (for example, an automobile or a rail vehicle), and the vehicle seat 1 includes a back frame 2 and a cushion frame 3. The back frame 2 is a frame of a seat back that forms a backrest, and the cushion frame 3 is a frame of a seat cushion that forms a seating face.

The back frame 2 and the cushion frame 3 are made of metallic material, and the back frame 2 is arranged on a rear end side of the cushion frame 3. The back frame 2 and the cushion frame 3 support a cushion member (see FIG. 4 for a cushion member C of the back frame 2) that is made of foamed resin (for example, flexible polyurethane foam) having elasticity. The cushion member is covered with a cover (not illustrated) made of fabric, synthetic leather, leather, or similar material, thus forming the seat back and the seat cushion.

The back frame 2 includes a first support member 10 disposed via first spring members 4, and the first spring members 4 and the first support member 10 support a back side of the cushion member C (see FIG. 4) constituting the backrest. The cushion frame 3 includes a second support member 20 disposed via second spring members 5 and third spring members 6, and the second spring members 5, the third spring members 6 and the second support member 20 support a lower surface side of the cushion member (not illustrated) constituting a seating face.

The first support member 10 and the second support member 20 are members that support blower units U1 and U2, described below, to the back frame 2 and the cushion frame 3, respectively.

Figure 2:
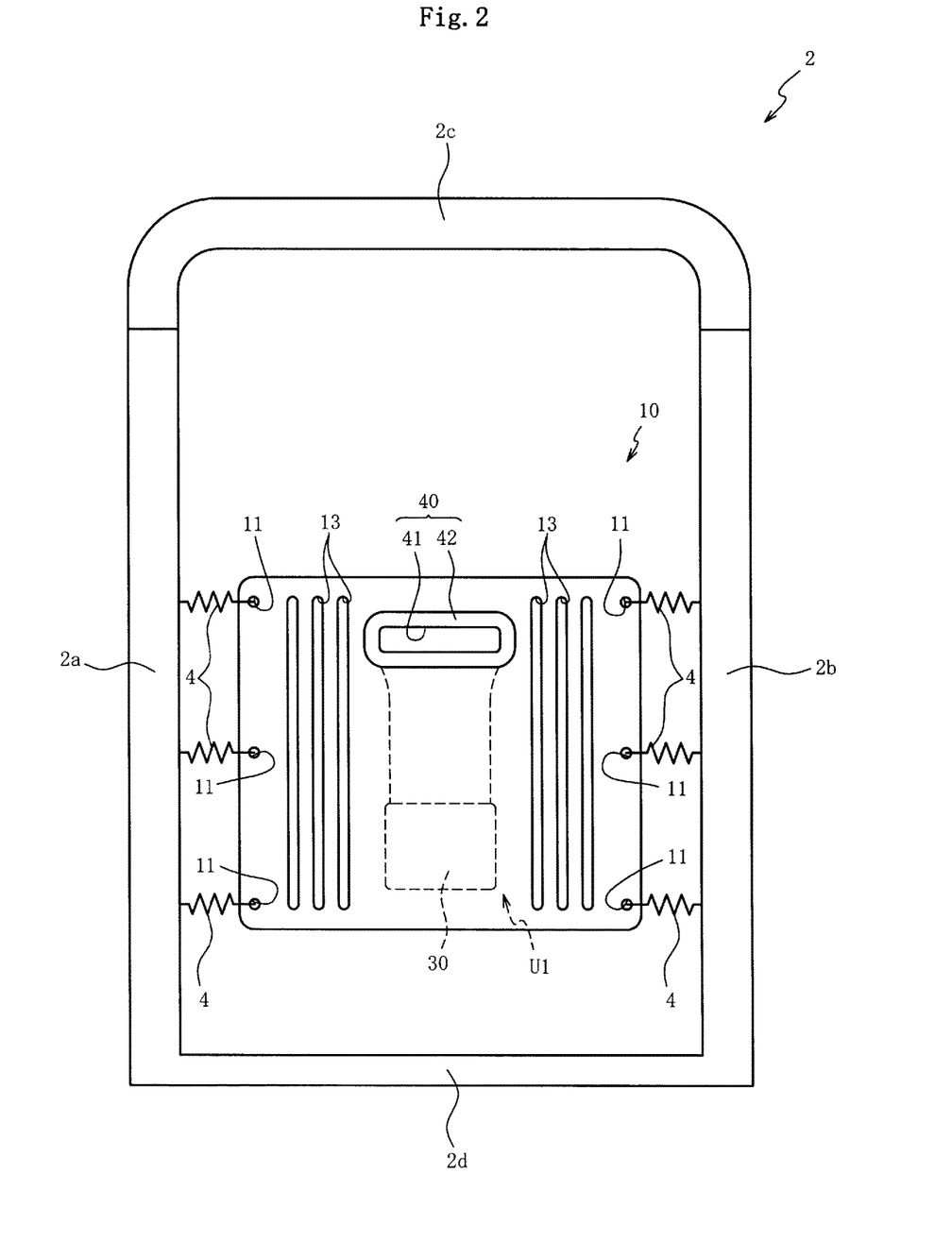
FIG. 2 is a front view of a back frame and a first support member.

Next, a description will be given of a detailed configuration of the first support member 10 disposed on the back frame 2 with reference to FIG. 2. FIG. 2 is a front view of the back frame 2 and the first support member 10. In FIG. 2, a part of the back frame 2 is omitted to be indicated schematically.

As illustrated in FIG. 2, the back frame 2 includes a pair of vertical frames 2a and 2b, and a pair of horizontal frames 2c and 2d, so as to be formed into an approximately rectangular shape. The pair of the vertical frames 2a and 2b are disposed to extend in a vertical direction of the back frame 2 (vertical direction of FIG. 2). The pair of the horizontal frames 2c and 2d couple upper ends of the pair of the vertical frames 2a and 2b to one another, and couple lower ends of the pair of the vertical frames 2a and 2b to one another.

The pair of the vertical frames 2a and 2b each include three first spring members 4 at a predetermined interval along the extending direction, and the first spring members 4 are constituted of coil springs. The first support member 10 is elastically supported between the pair of the facing vertical frames 2a and 2b via a plurality of (six pieces in total) the first spring members 4. The first support member 10 has a back surface (a surface of a far-side in a direction perpendicular to the paper surface of FIG. 2) where the blower unit U1 is disposed including a blower 30 and a duct 40.

The first support member 10 includes a plurality of (in the embodiment, three pieces on an edge of each of the vertical frame 2a side and the vertical frame 2b side, six pieces in total) first opening portions 11, a second opening portion 12 (see FIG. 3A and FIG. 4), and a plurality of slit portions 13, and the first support member 10 is made of resin material with predetermined elasticity to be formed into a rectangular flat plate-shape. The plurality of the first opening portions 11 is formed on the edges of the pair of the vertical frames 2a and 2b sides. The second opening portion 12 is formed on a center side in a lateral direction (lateral direction of FIG. 2) of the first support member 10 with respect to the first opening portions 11. The plurality of the slit portions 13 is formed on both sides in the lateral direction of the first support member 10 across the second opening portion 12 (between the first opening portion 11 and the second opening portion 12).

The first opening portions 11, the second opening portion 12 and the slit portions 13 are formed as through-holes passing through in a thickness direction of the first support member 10 (the direction perpendicular to the paper surface of FIG. 2). The first opening portions 11 are disposed at a predetermined interval along the vertical direction of the first support member 10 (for example, the three first opening portions 11 disposed on the vertical frame 2a side are disposed along the vertical direction (vertical direction of FIG. 2) of the first support member 10 at regular intervals with a predetermined interval). The first spring members 4 are each coupled to the plurality of the first opening portions 11.

Accordingly, the first support member 10 supporting the blower unit U1 is supported to the pair of the vertical frames 2a and 2b via the first spring members 4 installed to the outer edge of the first support member 10. Then, the blower unit U1 is ensured being supported by the first spring members 4 without overlapping of the first support member 10 and the blower unit U1 on the first spring members 4 in the thickness direction (the direction perpendicular to the paper surface of FIG. 2) of the seat back.

Therefore, for example, the cushion member C (see FIG. 4) can be formed to be thick in the thickness direction of the seat back, thus improving seating comfort of the vehicle seat 1. Otherwise, the seat back can be formed to be thin, thus ensuring expanding a space on a seated person side, or disposing other members in the thickness direction of the seat back by the amount of the decreased thickness of the seat back. That is, since the first support member 10 and the blower unit U1 do not overlap the first spring members 4 in the thickness direction of the seat back, the generated space can be efficiently used.

Since the first support member 10 is made of resin material to be formed into the flat plate-shape, the first support member 10 is easily bent along deformation of the cushion member C when the cushion member C is deformed due to a load of the seated person. This improves the seating comfort of the vehicle seat 1.

The second opening portion 12 is formed on an upper end side of the first support member 10 at an approximately central portion in the lateral direction of the first support member 10, and the second opening portion 12 holds a distal end (a flange portion 42 described later) of the duct 40.

The slit portions 13 are disposed to extend along the vertical direction of the first support member 10. The plurality of (in the embodiment, six pieces) slit portions 13 is formed (in a row) along the lateral direction of the first support member 10, and three pieces of the slit portions 13 are formed on each region between the region where the blower unit U1 is disposed and the first opening portions 11.

As described above, the slit portions 13 are formed to pass through in the thickness direction of the first support member 10, thus decreasing rigidity of the first support member 10 in the region where the slit portions 13 are formed. Accordingly, the first support member 10 is easily bent along the deformation of the cushion member C.

Further, the first opening portions 11 are disposed along the vertical direction of the first support member 10 (for example, three first opening portions 11 disposed on the vertical frame 2a side are each disposed along the vertical direction of the first support member 10), and the slit portions 13 are disposed to extend along a direction parallel to the disposing direction of the three first opening portions 11, thus causing the first support member 10 to be more easily bent along the deformation of the cushion member C. This improves the seating comfort of the vehicle seat 1.

Figure 3A:
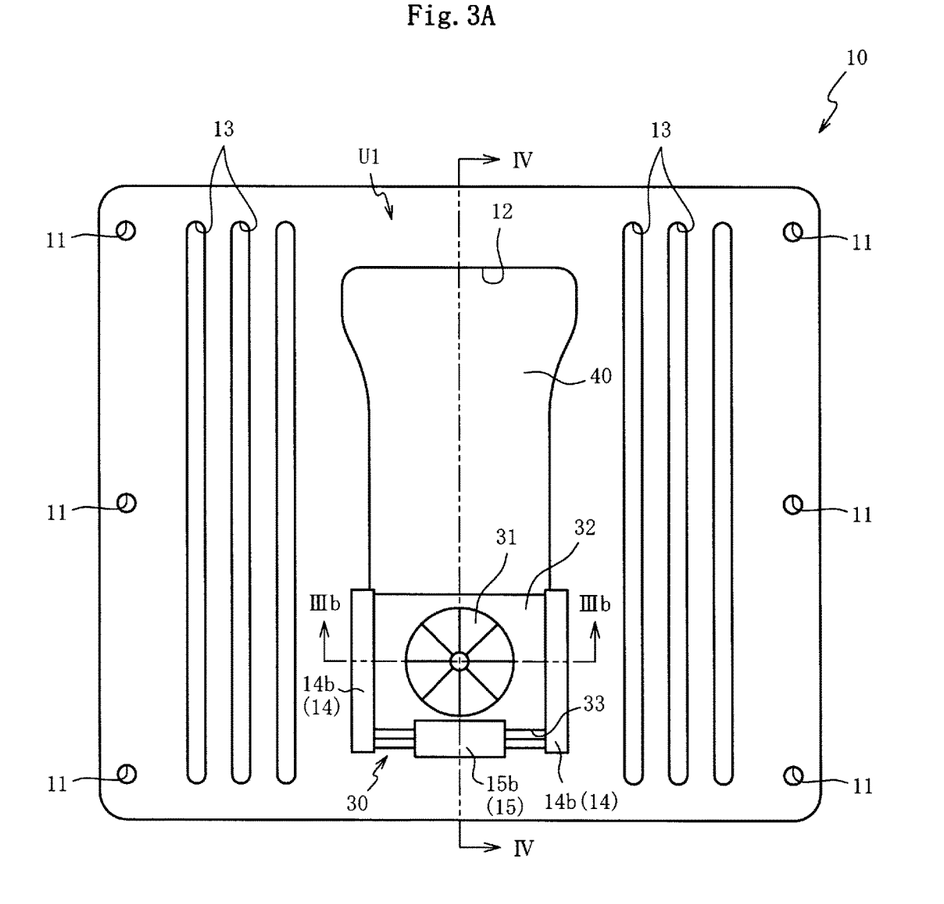
FIG. 3A is a back view of the first support member and a blower unit.
Figure 3B:
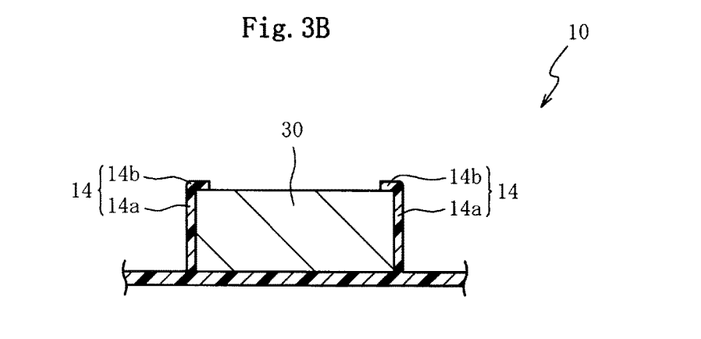
FIG. 3B is a cross-sectional view taken along line IIIb-IIIb in FIG. 3A.
Figure 4:
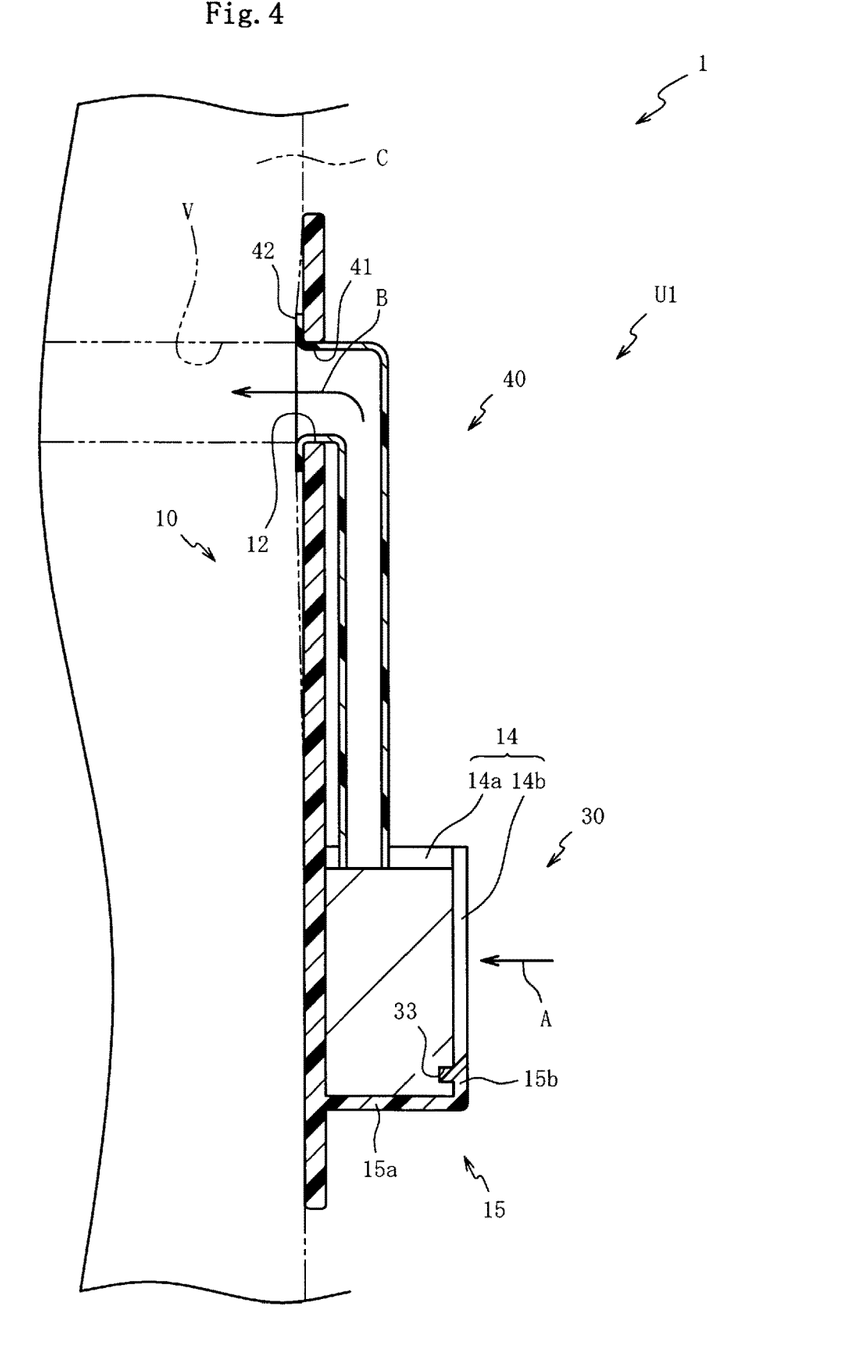
FIG. 4 is a cross-sectional view taken along line IV-IV in FIG. 3A.

Next, a description will be given of a detailed configuration of the first support member 10 and the blower unit U1 with reference to FIG. 3 and FIG. 4. FIG. 3A is a back view of the first support member 10 and the blower unit U1, and FIG. 3B is a cross-sectional view taken along line IIIb-IIIb in FIG. 3A. FIG. 4 is a cross-sectional view taken along line IV-IV in FIG. 3A. In FIG. 4, an internal structure of the blower 30 is not illustrated, but a cross section of the blower 30 is indicated by hatching. Arrows A and B in FIG. 4 indicate air movement paths.

As illustrated in FIG. 3 and FIG. 4, the blower unit U1 includes the blower 30 for blowing air, and the duct 40 coupled to the blower 30. The blower unit U1 is air conditioning equipment that sucks air from the rear of the seat back (see movement path A in FIG. 4) to send the air to a vent V (movement path B) formed on the cushion member C. The blower unit U1 may be configured so as to suck air from the vent V of the cushion member C.

The duct 40 is made of resin material with predetermined flexibility, and the duct 40 is disposed to extend upward from a top surface (upper side surface of FIG. 4) of the blower 30. The duct 40 includes an opening 41 formed on a distal end of the duct 40, and the flange portion 42 projecting outward in a flange shape from the distal end portion of the duct 40.

When the flange portion 42 is inserted into the second opening portion 12 from a back side (right side of FIG. 4) of the first support member 10 while making the flange portion 42 narrower so as to cause the flange portion 42 to be locked to the second opening portion 12, the distal end of the duct 40 is held onto the second opening portion 12, thus the duct 40 is secured to the first support member 10 in a posture where the opening 41 faces the cushion member C side.

Then, the distal end (the flange portion 42) of the duct 40 is held onto the first support member 10, thus inhibiting the duct 40 from projecting to the cushion member C side from the first support member 10. Accordingly, the thickness of the cushion member C can be configured to be thicker by an amount obtained with the duct 40 not projecting to the cushion member C side, thus improving the seating comfort of the vehicle seat 1.

In this case, since the flange portion 42 of the duct 40 is arranged on the cushion member C side of the first support member 10, applying the load of the seated person on the cushion member C causes the cushion member C to press the flange portion 42 to the first support member 10 side (the flange portion 42 is sandwiched between the cushion member C and the first support member 10). Accordingly, when the first support member 10 is bent due to the deformation of the cushion member C, the duct 40 (the flange portion 42) is prevented from coming off from the second opening portion 12. Further, even when the first support member 10 is bent, adhesion between the vent V of the cushion member C and the flange portion 42 of the duct 40 can be increased, thus enhancing the efficiency of air conditioning.

The blower 30 includes a fan 31 (see FIG. 3A) for sucking or sending out air and a case 32 for housing the fan 31, and the blower 30 is formed into an approximately rectangular parallelepiped shape. The case 32 has a back surface (a surface on the opposite side to the first support member 10 side, a surface on the near-side in the direction perpendicular to the paper surface of FIG. 3A) where a depressed groove 33 is depressed such that a holding portion 15, which will be described later, of the first support member 10 is fitted to the depressed groove 33. The depressed groove 33 is disposed to extend in the lateral direction (extending direction of the holding portion 15, which will be described later, of the first support member 10, the lateral direction of FIG. 3A) of the blower 30, and the depressed groove 33 is depressed in a rectangular shape in a cross-sectional view (see FIG. 4).

The first support member 10 includes a pair of guiding portions 14 and a holding portion 15. The pair of the guiding portions 14 are disposed on the back surface of the first support member 10 (a surface on the opposite side to the cushion member C, a surface on the near-side in the direction perpendicular to the paper surface of FIG. 3A), and the pair of the guiding portions 14 are disposed to extend in the vertical direction of the first support member 10. The holding portion 15 is disposed on one side (lower side of FIG. 3A) in the extending direction of the pair of the guiding portions 14, and the holding portion 15 is disposed to extend in a direction perpendicular to the extending direction of the pair of the guiding portions 14.

The pair of the guiding portions 14 each include a standing portion 14a (see FIG. 3B) and a bent portion 14b so as to be formed into an L-shape in a cross-sectional view. The standing portion 14a is vertically disposed upright on the back surface of the first support member 10. The bent portion 14b is bent on an upright end of the standing portion 14a inward in a direction in which the pair of the guiding portions 14 face one another.

A facing interval between the standing portions 14a of the pair of the guiding portions 14 and a facing interval between the back surface of the first support member 10 and the bent portion 14b are configured to be dimensions corresponding to the outer shape of the case 32 of the blower 30. The case 32 of the blower 30 is formed to be slidably movable with respect to the pair of the guiding portions 14.

The holding portion 15 includes a standing portion 15a (see FIG. 4) and a bent portion 15b so as to be formed as a protrusion with an L-shaped cross section. The standing portion 15a is vertically disposed upright on the back surface of the first support member 10. The bent portion 15b is bent upward (upper side of FIG. 4) on an upright end of the standing portion 15a.

The blower 30 is slid to be inserted between the pair of the guiding portions 14 from the other side (upper side of FIG. 3A) in the extending direction of the pair of the guiding portions 14, and when the blower 30 abuts on the holding portion 15, the slide move in the insertion direction is restricted. This ensures the blower unit U1 to be easily installed on the first support member 10.

Here, the bent portion 15b of the holding portion 15 includes a protrusion projecting to the back side of the first support member 10, and the protrusion has an inclined surface gradually away from the back surface of the first support member 10 from a base end side to a distal end side of the bent portion 15b (from the lower side to the upper side of FIG. 4), thus pushing the blower 30 to the holding portion 15 side while slidably moving the blower 30 with respect to the pair of the guiding portions 14 causes the protrusion of the bent portion 15b to be fitted to the depressed groove 33 of the blower 30. This ensures the insertion state of the blower 30 inserted between the pair of the guiding portions 14 to be maintained by the holding portion 15.

That is, the slide move of the blower 30 in the insertion direction to the pair of the guiding portions 14 is restricted by the standing portion 15a of the holding portion 15, thus easily positioning the blower 30 with respect to the pair of the guiding portions 14.

The blower 30 is secured to the first support member 10 in a state where the bent portion 15b of the holding portion 15 restricts the slide move in a direction in which the blower 30 is pulled out of the pair of the guiding portions 14, thus preventing the blower 30 from dropping off the pair of the guiding portions 14 due to vibrations of the blower 30 and the deformation of the first support member 10.

In this case, the slit portions 13 are formed on the first opening portion 11 sides (both right and left sides of FIG.

3A) with respect to the region where the pair of the guiding portions 14 and the holding portion 15 (the blower 30) are disposed. Then, while the rigidity of the first support member 10 is maintained in the region where the pair of the guiding portions 14 and the holding portion 15 are disposed, the rigidity of the first support member 10 can be decreased on the outer edge sides with respect to the region.

Therefore, while an influence of the deformation of the first support member 10 on the second opening portion 12, the pair of the guiding portions 14, and the holding portion 15 is reduced, the deformability of the first support member 10 is ensured on the outer edge sides with respect to a region where the second opening portion 12, the pair of the guiding portions 14, and the holding portion 15 are disposed. Accordingly, while the dropping of the duct 40 out of the second opening portion 12 and the dropping of the blower 30 out of the pair of the guiding portions 14 and the holding portion 15 are reduced, the seating comfort of the vehicle seat 1 can be improved.

Figure 5A:
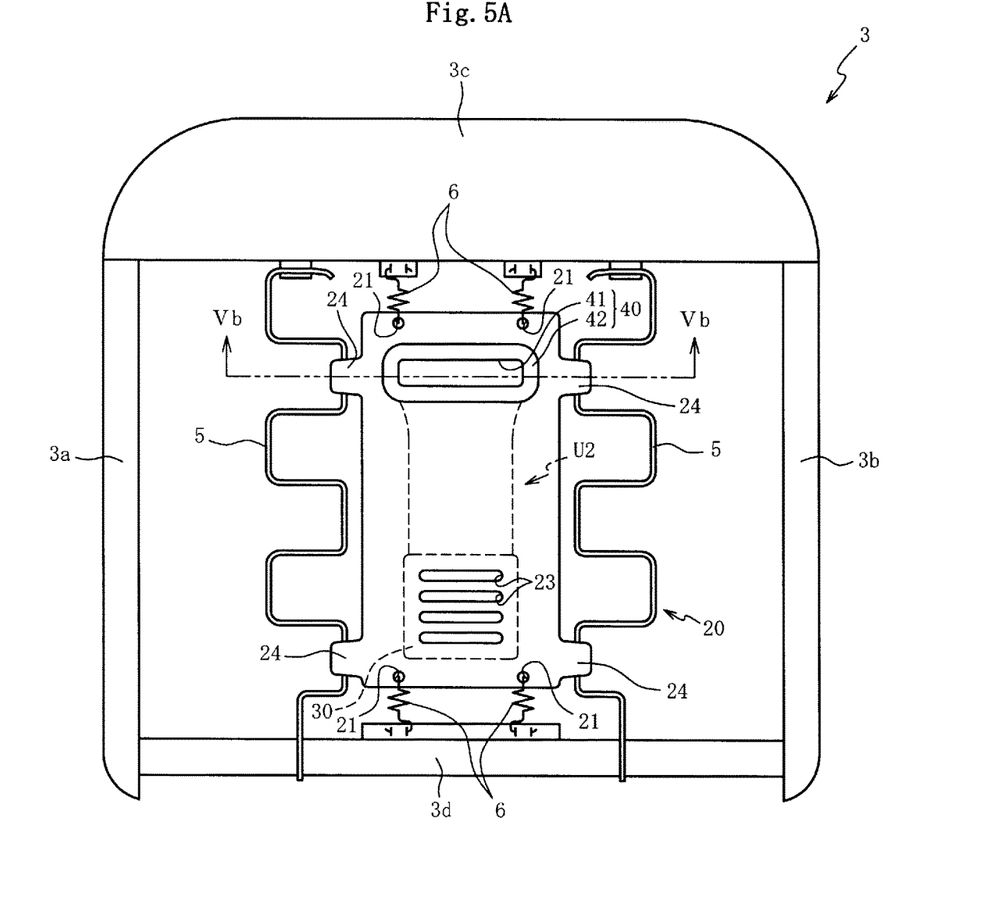
FIG. 5A is a top view of a cushion frame and a second support member.
Figure 5B:
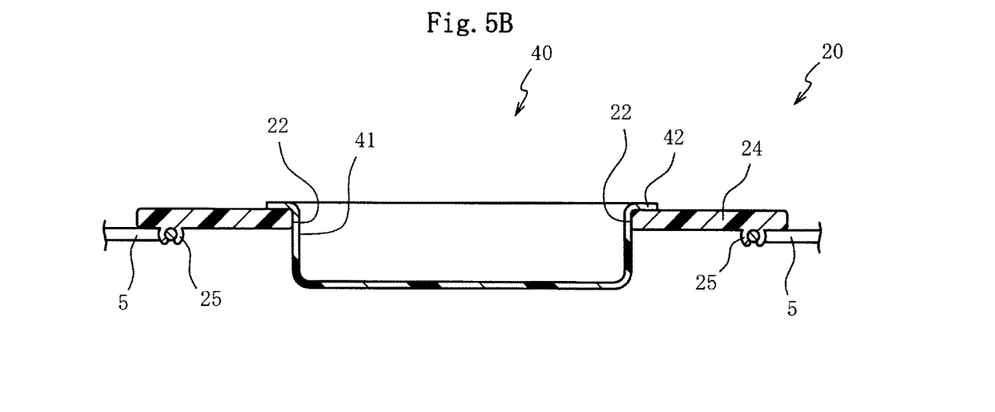
FIG. 5B is a cross-sectional view taken along line Vb-Vb in FIG. 5A.

Next, a description will be given of a detailed configuration of the second support member 20 disposed on the cushion frame 3 with reference to FIG. 5. FIG. 5A is a top view of the cushion frame 3 and the second support member 20, and FIG. 5B is a cross-sectional view taken along line Vb-Vb in FIG. 5A. In FIG. 5A, a part of the cushion frame 3 is omitted to be indicated schematically.

As illustrated in FIG. 5, the cushion frame 3 includes a pair of vertical frames 3a and 3b, and a pair of horizontal frames 3c and 3d, so as to be formed into an approximately rectangular shape. The pair of the vertical frames 3a and 3b are disposed to extend in a front-back direction of the cushion frame 3 (vertical direction of FIG. 5A). The pair of the horizontal frames 3c and 3d couple front ends of the pair of the vertical frames 3a and 3b to one another, and couple rear ends of the pair of the vertical frames 3a and 3b to one another.

Between the pair of the facing horizontal frames 3c and 3d, a pair of second spring members 5 are bridged, and the pair of the second spring members 5 are formed as a seat spring (zigzag spring) that winds in a direction parallel or perpendicular to the extending direction of the second spring members 5 and has a circular cross section. The pair of the horizontal frames 3c and 3d each include two third spring members 6 at a predetermined interval in the extending direction of the pair of the horizontal frames 3c and 3d, and the third spring members 6 are constituted of coil springs.

The second support member 20 is disposed to bridge across the pair of the facing second spring members 5, and the second support member 20 is coupled to each of the pair of the facing horizontal frames 3c and 3d by the third spring members 6. The second support member 20 has a lower surface (a surface on a far-side in a direction perpendicular to the paper surface of FIG. 5A) where the blower unit U2 is disposed including a blower 30 and a duct 40.

The second support member 20 includes a plurality of (in the embodiment, two pieces on an edge of each of the horizontal frame 3c side and the horizontal frame 3d side, four pieces in total) first opening portions 21, a second opening portion 22 (see FIG. 5B), and slit portions 23, and the second support member 20 is made of resin material with predetermined elasticity to be formed into a rectangular flat plate-shape. The plurality of the first opening portions 21 is formed on the edges of the pair of the horizontal frames 3c and 3d sides on the second support member 20. The second opening portion 22 is formed on a center side in a front-back direction of the second support member 20 with respect to the first opening portions 21. The second support member 20 is formed to have a dimension in the front-back direction slightly smaller compared with the facing interval between the pair of the horizontal frames 3c and 3d.

The first opening portions 21, the second opening portion 22, and the slit portions 23 are formed as through-holes passing through in a thickness direction of the second support member 20 (the direction perpendicular to the paper surface of FIG. 5A). The plurality of the first opening portions 21 is each disposed at a predetermined interval along the lateral direction of the second support member 20 (for example, the two first opening portions 21 disposed on the horizontal frame 3c side are disposed along the lateral direction at a predetermined interval). The third spring members 6 are each coupled to the plurality of the first opening portions 21.

The second opening portion 22 is an opening for holding a distal end of the duct 40, and the second opening portion 22 is formed on a front end side in the front-back direction of the second support member 20. To the second opening portion 22, a flange portion 42 of the duct 40 locks.

The slit portions 23 are formed (see FIG. 5A) on a rear end side of the second support member 20 with respect to the second opening portion 22, and the slit portions 23 are disposed to extend in the lateral direction (lateral direction of FIG. 5A) of the second support member 20. A plurality of (in the embodiment, four pieces) the slit portions 23 is formed (in a row) along the front-back direction of the second support member 20, and the respective slit portions 23 are formed inside a region (region surrounded by guiding portions 26 and the holding portion 27 of the second support member 20, which will be described later) where the blower 30 is disposed.

As described above, the slit portions 23 are formed to pass through in the thickness direction of the second support member 20, thus decreasing rigidity of the second support member 20 in the region where the slit portions 23 are formed. Accordingly, the second support member 20 is easily bent along the deformation of the cushion member, thus improving the seating comfort of the vehicle seat 1.

The second support member 20 has four corners where protruding portions 24 are each formed to project to the second spring members 5 sides from outer edges of the second support member 20, and the protruding portions 24 each has a lower surface where a coupling portion 25 is formed to couple the second support member 20 to the second spring members 5 (see FIG. 5B).

The coupling portion 25 is disposed to extend in the front-back direction of the second support member 20, and the coupling portion 25 is formed as a pair of protrusions projecting downward from the lower surface of the protruding portion 24. The coupling portion 25 is formed into a C shape in a cross-sectional view, and the coupling portion 25 is rotatably formed around the second spring member 5 in a state of sandwiching the second spring member 5. With the second spring member 5 sandwiched by the coupling portion 25, the second support member 20 is supported to the second spring member 5.

Accordingly, the second support member 20 supporting the blower unit U2 is elastically supported to the pair of the horizontal frames 3c and 3d via the second spring members 5 bridged across the pair of the horizontal frames 3c and 3d, and the third spring members 6 bridged across the second support member 20 and the pair of the horizontal frames 3c and 3d. Then, the blower unit U2 is ensured being supported by the second spring members 5 and the third spring members 6 without overlapping of the second support member 20 and the blower unit U2 on the second spring members 5 and the third spring members 6 in the thickness direction (the direction perpendicular to the paper surface of FIG. 5) of the seat cushion.

Therefore, for example, the cushion member can be formed to be thick in the thickness direction of the seat cushion, thus improving the seating comfort of the vehicle seat 1. Otherwise, the seat cushion can be formed to be thin, thus ensuring expanding a space on the seated person side, or disposing other members in the thickness direction of the seat back by the amount of the decreased thickness of the seat cushion. That is, since the second support member 20 and the blower unit U2 do not overlap the second spring members 5 and the third spring members 6 in the thickness direction of the seat cushion, the generated space can be efficiently used.

While, conventionally, a spring member that has a configuration identical to the second spring member 5 is disposed in the region where the second support member 20 is disposed, the embodiment omits the spring member. Accordingly, the second support member 20 doubles as a member for supporting the blower unit U2 and a member for supporting the cushion member, thus reducing the number of components to reduce the product cost of the vehicle seat 1.

Since the second support member 20 is made of resin material to be formed into the flat plate-shape, the second support member 20 is easily bent along deformation of the cushion member when the cushion member is deformed due to the load of the seated person. This improves the seating comfort of the vehicle seat 1.

Here, since the coupling portion 25 formed on the protruding portion 24 is rotatably formed with respect to the second spring member 5, when the second support member 20 is bent along the deformation of the cushion member, the coupling portion 25 can rotate around the second spring member 5 in accordance with the bending. In this case, since the protruding portion 24, on which the coupling portion 25 is formed, is formed projecting from the outer edge of the second support member 20 to the second spring member 5 side, the protruding portion 24 is formed to have the rigidity lower than the rigidity of the center side of the second support member 20. Accordingly, the protruding portion 24 is formed to have the low rigidity so as to be easily bent, and the protruding portion 24 is formed to be rotatable around the second spring member 5 by the coupling portion 25, thus making the second support member 20 easily bent along the deformation of the cushion member. Therefore, the seating comfort of the vehicle seat 1 is improved.

Since the coupling portion 25 is formed into the C shape in the cross-sectional view, fitting the coupling portion 25 to the second spring member 5 from above causes the second support member 20 to be supported to the second spring member 5. This ensures easy assembling of the second support member 20 to the cushion frame 3.

A pair of the protruding portions 24 formed on the front end side (upper side of FIG. 5A) of the second support member 20 are each arranged on both sides in the lateral direction of the second support member 20 across the flange portion 42 (the second opening portion 22) (the flange portion 42 and the pair of protruding portions 24 are each arranged on a straight line along the lateral direction of the second support member 20. The two first opening portions 21 formed on the front end side of the second support member 20 are formed on the center side of the second support member 20 with respect to both ends of the flange portion 42 in the lateral direction of the second support member 20. That is, the second spring members 5 and the third spring members 6 are coupled to the second support member 20 on the peripheral area of the flange portion 42 (the second opening portion 22).

Accordingly, when a load of the seated person is applied on the cushion member, reactive forces of the second spring members 5 and the third spring members 6 against the load act on the second support member 20. Then, the flange portion 42, which is arranged adjacent to the first opening portions 21 and the protruding portions 24, of the duct 40 is pressed to the cushion member side due to the reactive forces of the second spring members 5 and the third spring members 6.

Therefore, when the second support member 20 is bent due to the deformation of the cushion member, the distal end of the duct 40 is prevented from coming off from the second opening portion 22. Further, even when the first support member 10 is bent, adhesion between the vent of the cushion member and the flange portion 42 of the duct 40 can be increased, thus enhancing the efficiency of air conditioning.

Figure 6:
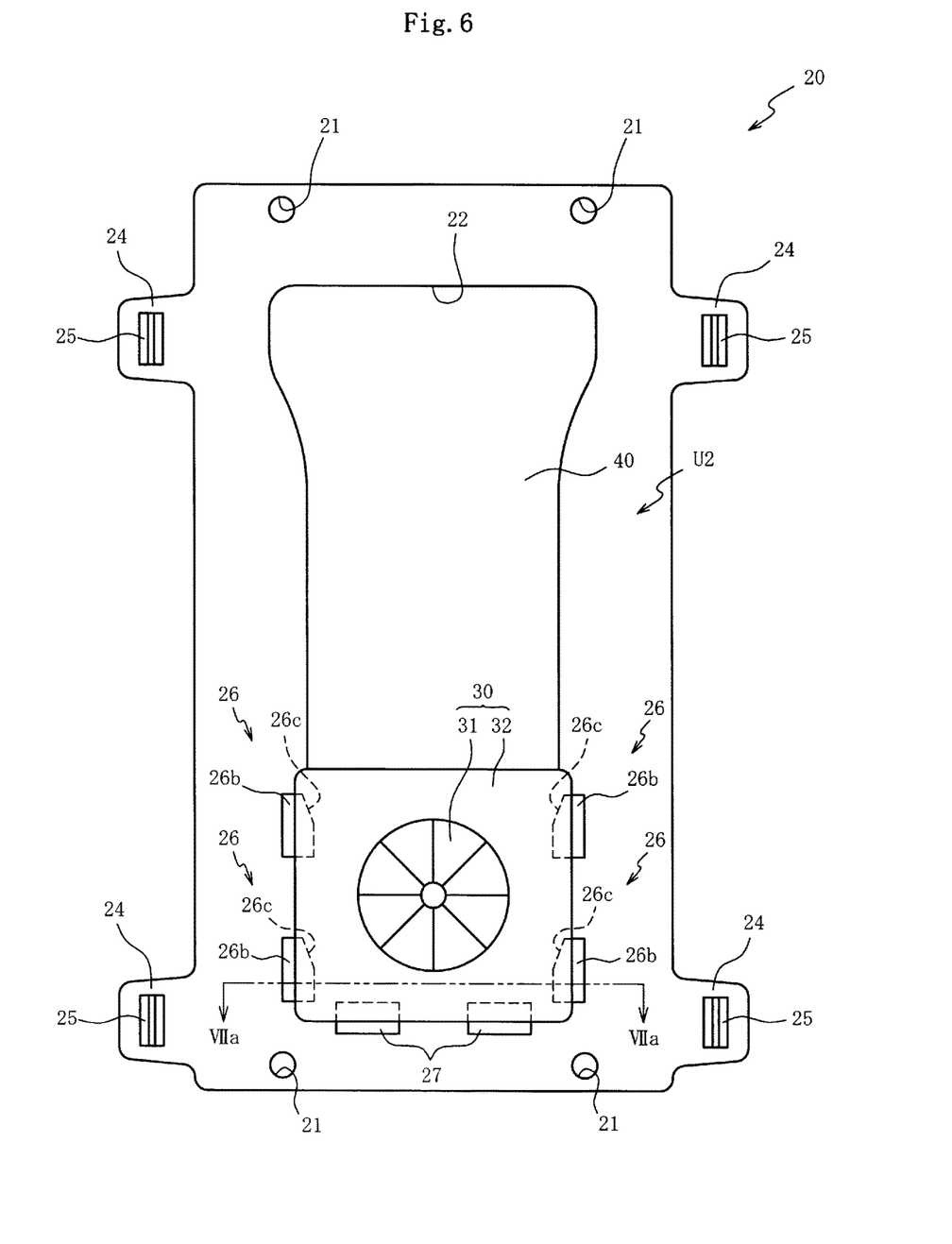
FIG. 6 is a bottom view of the second support member and a blower unit.
Figure 7A:
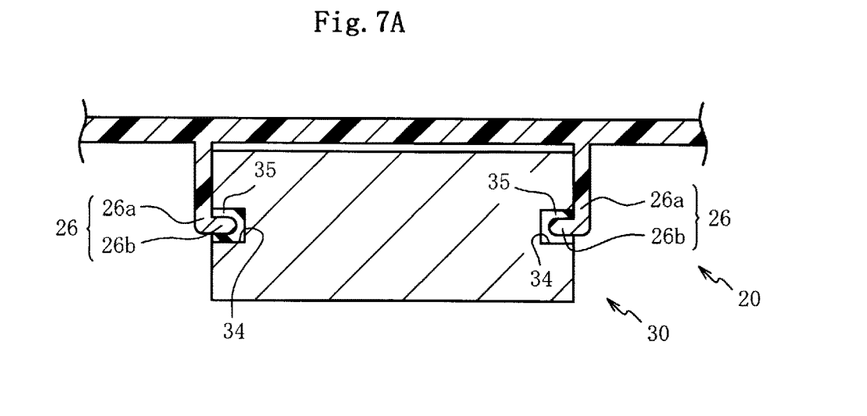
FIG. 7A is a cross-sectional view taken along line VIIa-VIIa in FIG. 6.
Figure 7B:
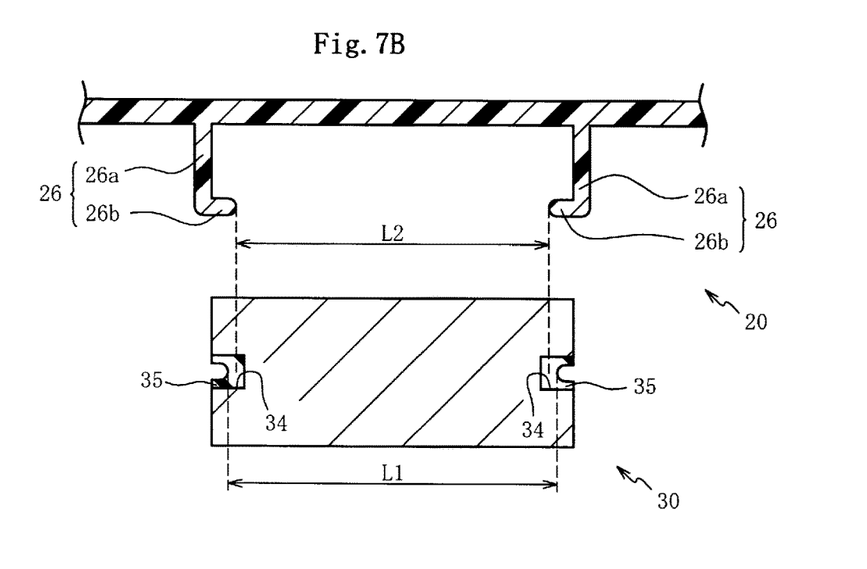
FIG. 7B is a cross-sectional view illustrating a state where a blower is removed from a state of FIG. 7A.
Figure 7C:
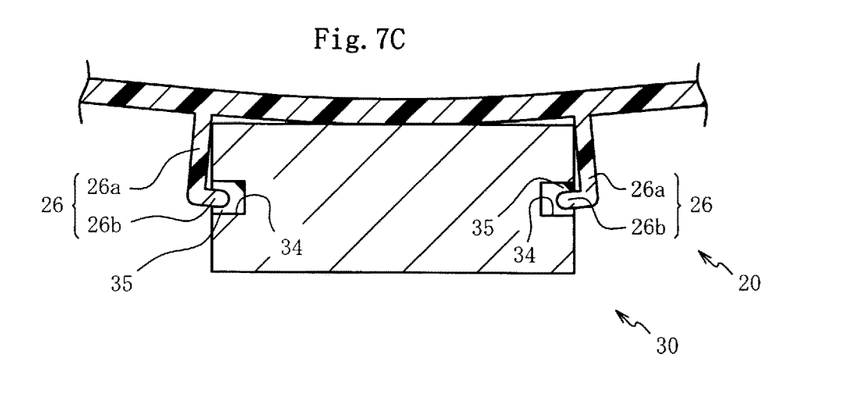
FIG. 7C is a cross-sectional view illustrating a state where the second support member is bent from the state of FIG. 7A.

Next, a description will be given of a detailed configuration of the second support member 20 and the blower unit U2 with reference to FIG. 6 and FIG. 7. FIG. 6 is a bottom view of the second support member 20 and the blower unit U2. FIG. 7A is a cross-sectional view taken along line VIIa-VIIa in FIG. 6, FIG. 7B is a cross-sectional view illustrating a state where the blower 30 is removed from a state of FIG. 7A, and FIG. 7C is a cross-sectional view illustrating a state where the second support member 20 is bent from the state of FIG. 7A. In FIG. 6, configurations other than the second support member 20 and the blower unit U2 are not illustrated. In FIG. 7, an internal structure of the blower 30 is not illustrated, and the cross section of the blower 30 is illustrated by hatching.

Here, the blower unit U2 has a part configured to be identical to the blower unit U1. Like reference numerals designate corresponding or identical elements in the above-described blower unit U1, and therefore such elements will not be further elaborated here.

As illustrated in FIG. 6 and FIG. 7, the blower 30 of the blower unit U2 includes a case 32 where a depressed groove 34 is formed (see FIG. 7) along an outer periphery of the case 32, and the depressed groove 34 includes a rubber portion 35 that is constituted of a rubber elastic body and has an approximately U shape in a cross-sectional view. The depressed groove 34 is formed along extending directions of a pair of the guiding portions 26 and a holding portion 27 of the second support member 20 described later, and the depressed groove 34 is depressed into a rectangular shape in the cross-sectional view.

The second support member 20 includes the pair of the guiding portions 26 and a pair of the holding portions 27. The pair of the guiding portions 26 are disposed upright on a lower surface of the second support member 20 (a surface on the opposite side to the cushion member, a surface on the near-side in the direction perpendicular to the paper surface of FIG. 6), and the pair of the guiding portions 26 are disposed to extend in the front-back direction (vertical direction of FIG. 6) of the second support member 20. The pair of the holding portions 27 are formed on a rear end side of the second support member 20 with respect to the pair of the guiding portions 26.

Two pairs of the guiding portions 26 are disposed at a predetermined interval in the front-back direction of the second support member 20. While the above-described first support member 10 includes the pair of the guiding portions 14 continuously formed along the vertical direction of the first support member 10, the second support member 20 includes the two pairs of the guiding portions 26 so as to be arranged in an intermittent manner along the extending direction of the guiding portions 26 (formed such that an extending length of the two pairs of the guiding portions 26 is shorter than a dimension of the blower 30 in the front-back direction of the second support member 20).

The pair of the guiding portions 26 each include a standing portion 26a (see FIG. 7), a bent portion 26b, and a cut-out portion 26c so as to be formed as a protrusion having an L shape in a cross-sectional view. The standing portion 26a is vertically disposed upright on the lower surface of the second support member 20. The bent portion 26b is bent on an upright end of the standing portion 26a inward in a direction in which the pair of the guiding portions 26 face one another. The cut-out portion 26c is formed on the bent portion 26b.

A facing interval between a pair of standing portions 26a is configured to be approximately identical (or slightly larger) to the width dimension (dimension in the lateral direction of FIG. 7) of the blower 30 in the facing direction. The facing interval between the back surface of the second support member 20 and the bent portion 26b is configured so as to be a dimension where the blower 30 is separated from the second support member 20 in the thickness direction of the second support member 20 when the blower 30 is secured to the pair of the guiding portions 26.

In a state where the bent portions 26b of the guiding portions 26 are fitted to the rubber portions 35 of the blower 30, the blower 30 is configured to be slidably movable with respect to the pair of the guiding portions 26. The blower 30 is slidably inserted from one side (opposite side to the side where the pair of the holding portions 27 are formed, upper side of FIG. 6) in the extending direction of the pair of the guiding portions 26, and when the blower 30 abuts on the holding portion 27, the slide move in the insertion direction is restricted.

The holding portion 27 is disposed to extend in the lateral direction of the second support member 20. The holding portion 27 includes a standing portion and a bent portion so as to be formed as a protrusion with an L-shaped cross section. The standing portion is vertically disposed upright on the back surface of the second support member 20. The bent portion is bent to the front end side of the second support member 20 on an upright end of the standing portion. That is, the holding portion 27 is formed to have a shape (a cross-sectional shape) identical to the pair of the guiding portions 26 other than a point where the extending direction is different and the cut-out portion 26c is not formed.

Then, the pair of the guiding portions 26 can slidably move the blower 30 and the holding portion 27 can position the slide move of the blower 30 in the insertion direction. This ensures the blower unit U2 to be easily installed on the second support member 20.

In this case, since the rubber portion 35 is interposed (see FIG. 7A) between the bent portion 26b of the guiding portion 26 (the bent portion of the holding portion 27) and the depressed groove 34 of the blower 30, the rubber portion 35 attenuates the vibration of the blower 30. This inhibits the vibration of the blower 30 from being transmitted to the second support member 20, thus inhibiting the vibration from being transmitted to the seated person via the second support member 20. Accordingly, the seating comfort of the vehicle seat 1 is improved.

Further, according to the embodiment, in the facing direction of the pair of the guiding portions 26, a facing interval L2 between the distal ends of the bent portions 26b of the pair of the guiding portions 26 is formed to be narrower than a width dimension L1 (see FIG. 7B) as an interval between the bottom surfaces of the rubber portions 35. That is, when the blower 30 is inserted between the pair of the facing guiding portions 26, the bent portion 26b bites into the rubber portion 35, thus securing the blower 30 to the pair of the guiding portions 26 in a state where the rubber portion 35 is elastically deformed.

Accordingly, a friction force of the rubber portion 35 acts between the bent portion 26b of the guiding portion 26 and the rubber portion 35 of the blower 30, thus preventing the blower 30 from slidably moving in a direction in which the blower 30 is pulled out of the pair of the guiding portions 26. That is, the blower 30 is secured to the second support member 20 in a state where the slide move in the direction inserted between the pair of the guiding portions 26 is restricted by the holding portion 27 and the slide move in the direction pulled out of the pair of the guiding portions 26 is restricted by the friction force of the rubber portion 35. This prevents the blower 30 from dropping off the pair of the guiding portions 26.

In this case, the facing interval L2 between the distal ends of the bent portions 26b is formed to be narrower than the width dimension L1 as the interval between the bottom surfaces of the rubber portions 35, so as to cause a difficulty in inserting the blower 30 between the pair of the guiding portions 26.

In contrast, according to the vehicle seat 1 of the embodiment, the bent portions 26b of the pair of the guiding portions 26 include cut-out portions 26c. The cut-out portions 26c are formed such that the facing interval between the pair of the bent portions 26b in the lateral direction of the second support member 20 is gradually narrowed from the insertion side (upper side of FIG. 6) of the blower 30 in bottom view of the second support member 20.

Accordingly, the bent portion 26b is inhibited to abut on the rubber portion 35 in inserting the blower 30 between the pair of the guiding portions 26, and the cut-out portion 26c can guide the insertion of the blower 30, thus ensuring the blower 30 to be easily inserted between the pair of the guiding portions 26 (the holding portions 27).

Here, the guiding portions 26 and the holding portions 27 formed on the second support member 20 increase the rigidity of the part where the guiding portions 26 and the holding portions 27 are formed. At the same time, since the blower 30 is secured to the guiding portions 26 and the holding portions 27, the second support member 20 is difficult to be bent in the region where the guiding portions 26 and the holding portions 27 are formed.

In contrast, according to the vehicle seat 1 of the embodiment, the second support member 20 includes the slit portions 23 in the region where the blower unit U2 is arranged (that is, in the region surrounded by the pair of the guiding portions 26 and the holding portions 27). Accordingly, even when the pair of the guiding portions 26 and the holding portions 27 are formed on the second support member 20, and the blower 30 is secured to the pair of the guiding portions 26 and the holding portions 27, the second support member 20 is easily bent along the deformation of the cushion member.

Further, with the guiding portions 26 and the holding portions 27, to which the blower 30 is secured, intermittently formed along the extending direction of the guiding portions 26 and the holding portions 27, the second support member 20 can be formed to have a low rigidity compared with a case where the guiding portions 26 and the holding portions 27 are continuously formed along the extending direction.

Accordingly, the second support member 20 is easily bent along the deformation of the cushion member.

The blower 30 and the second support member 20 disposed separately in the thickness direction of the second support member 20 allow the second support member 20 to be bent to the blower 30 side by an amount of the separated space (see FIG. 7C). Accordingly, the second support member 20 is easily bent along the deformation of the cushion member.

Thus, with the second support member 20 formed to be easily bent along the deformation of the cushion member, the seating comfort of the vehicle seat 1 is improved even when the spring member, conventionally bridged across the region where the second support member 20 is disposed, is omitted and the second support member 20 is disposed instead of the spring member.

Since the blower 30 and the second support member 20 are separately disposed, the vibration of the blower 30 is transmitted to the second support member 20 side via only the rubber portion 35 constituted of a rubber elastic body (or the duct 40 constituted of flexible resin material). That is, the vibration of the blower 30 is inhibited to be directly transmitted to the second support member 20 compared with a case where the blower 30 is disposed in contact with the second support member 20. Then, the vibration is inhibited to be transmitted to the seated person via the second support member 20, thus the seating comfort of the vehicle seat 1 is improved. In this case, the separately disposed blower 30 and second support member 20 increase the thickness of the second support member 20 and the blower 30 in the thickness direction of the seat cushion. In contrast, according to the vehicle seat 1 of the embodiment, the guiding portions 26 and the holding portions 27 hold an outer periphery (side surfaces) of the blower 30, thus preventing the guiding portions 26 and the holding portions 27 from projecting to a lower side (lower side of FIG. 7) with respect to the blower 30. Accordingly, the thickness of the second support member 20 and the blower 30 is inhibited from increasing in the thickness direction of the seat cushion.

Here, with the second support member 20 formed to be easily bent, the pair of the guiding portions 26 are easily deformed so as to expand the facing interval due to the bending (see FIG. 7C). In contrast, according to the vehicle seat 1 of the embodiment, the blower 30 is secured to the pair of the guiding portions 26 in a state where the bent portions 26b bite into the rubber portions 35 to cause the rubber portion 35 to be elastically deformed. Then, the rubber portions 35 follow the deformation of the pair of the guiding portions 26 with elastic restoring forces of the rubber portions 35 even when the facing interval between the pair of the guiding portions 26 (the pair of the holding portions 27) expands due to the bending of the second support member 20. Accordingly, even when the second support member 20 is formed to be easily bent along the deformation of the cushion member, the blower 30 is prevented from dropping off the pair of the guiding portions 26.

Since the load of the seated person is relatively easy to apply on a proximity of the center in the front-back direction of the seat cushion (the second support member 20), the second opening portion 22, the guiding portions 26, and the holding portions 27 formed near the center in the front-back direction of the second support member 20 cause the blower unit U2 to easily drop off the second opening portion 22, the guiding portions 26, and the holding portions 27 due to the bending of the second support member 20.

In contrast, according to the vehicle seat 1 of the embodiment, the second opening portion 22 is formed on the front end side of the second support member 20, and the pair of the guiding portions 26 and the pair of the holding portions 27 are formed on the rear end side of the second support member 20. That is, the second opening portion 22, the guiding portions 26, and the holding portions 27 are formed on a region on which the load of the seated person is relatively difficult to apply.

Then, the region where the second opening portion 22, the guiding portions 26, and the holding portions 27 are formed is inhibited to be bent due to the load of the seated person (along the deformation of the cushion member), thus preventing the blower 30 and the duct 40 (the blower unit U2), which are secured to the second opening portion 22, the guiding portions 26 and the holding portions 27, from dropping off the second support member 20.

As described above, the present invention has been described based on the above-mentioned embodiments. It will be appreciated that the present invention will not be limited to the embodiments described above, but various modifications are possible without departing from the technical scope of the present invention.

While the above-described embodiment describes a case where the back frame 2 includes the first support member 10 and the cushion frame 3 includes the second support member 20, the disclosure is not limited to this. For example, a configuration may be employed such that the back frame 2 includes the second support member 20 and the cushion frame 3 includes the first support member 10.

While the above-described embodiment describes a case where the first support member 10 includes the holding portion 15 with the bent portion 15b that has the protrusion, a protrusion that has a shape identical to the protrusion may be formed on the bent portion of the holding portion 27 on the second support member 20. In this case, the depressed groove 33 formed on the blower 30 of the blower unit U2 ensures the blower 30 to be restricted to slidably move in the direction pulled out of the pair of the guiding portions 26.

While the above-described embodiment describes a case where the pair of the guiding portions 14 of the first support member 10 are continuously formed along the extending direction of the pair of the guiding portions 14, the disclosure is not limited to this. For example, the pair of the guiding portions 14 may be intermittently formed along the extending direction of the pair of the guiding portions 14.

While the above-described embodiment describes a case where the first spring members 4 are coupled to the edges of the first support member 10 on the pair of the vertical frames 2a and 2b sides, the disclosure is not limited to this. For example, the first spring members 4 may be disposed on only the edges on the pair of the horizontal frames 2c and 2d sides without disposing the first spring members 4 disposed on the edges on the pair of the vertical frames 2a and 2b sides.

A configuration may be employed such that the first spring member 4 is disposed on the edge on the horizontal frame 2c side or the horizontal frame 2d side in addition to the first spring members 4 disposed on the edges on the pair of the vertical frames 2a and 2b sides. In this case, the first spring members 4 are preferably bridged both across the facing first support member 10 and horizontal frame 2c and across the facing first support member 10 and horizontal frame 2d. That is, for example, with a configuration where the first spring members 4 are not disposed only between the facing first support member 10 and horizontal frame 2c, the elastic force (repulsion force against load) of the first support member 10 is decreased in the region where the first spring members 4 are not disposed.

In contrast, bridging the first spring members 4 both between the facing first support member 10 and horizontal frame 2c and between the facing first support member 10 and horizontal frame 2d causes the first support member 10 to be supported to the back frame 2 on four corners (both ends in the vertical direction and the lateral direction of FIG. 2). This makes the repulsion force of the first support member 10 against the load uniform, thus improving the seating comfort of the vehicle seat 1.

While the above-described embodiment describes a case where the slit portions 13 and 23 are formed as the through-holes passing through the first support member 10 and the second support member 20 in the thickness direction, the disclosure is not limited to this. For example, the slit portions 13 and 23 may be formed as depressions depressed in the thickness direction of the first support member 10 and the second support member 20. This case also ensures decreasing the rigidity of the first support member 10 and the second support member 20 in the regions where the slit portions 13 and 23 are formed.

While the above-described embodiment describes a case where the holding portions 15 and 27 formed on the first support member 10 and the second support member 20 restrict the slide move of the blower 30 in the insertion direction, the disclosure is not limited to this. For example, a configuration may be employed such that protruding portions are disposed on the end portions (end portions on the second opening portions 12 and 22 sides) on the opposite side of the insertion direction of the blower 30 so as to project out to the outer sides in the lateral directions of the first support member 10 and the second support member 20, and abutting of the protruding portions on the guiding portions 14 and 26 restricts the slide move of the blower 30 in the insertion direction.

While the above-described embodiment describes a case where the second support member 20 includes the two pairs of the guiding portions 26 (the guiding portions 26 are intermittently formed along the extending direction of the guiding portions 26), the disclosure is not limited to this. For example, the pair of the guiding portions 26 may be continuously formed along the extending direction of the pair of the guiding portions 26.

A configuration may be employed such that the pair of the guiding portions 26 and the holding portions 27 are formed to be continuous (coupled), and the guiding portions 26 and holding portions 27 are disposed to extend in a U shape in a bottom view of the second support member 20. This increases the rigidity of the guiding portions 26 and the holding portions 27 themselves, and increases the rigidity of the second support member 20 in the region where the guiding portions 26 and the holding portions 27 are formed. Accordingly, the region where the guiding portions 26 and the holding portions 27 are disposed is inhibited to be bent along the deformation of the cushion member, thus the blower unit U2 secured to the guiding portions 26 and the holding portions 27 is prevented from dropping off the second support member 20.

In this case, the slit portions 23 are preferably disposed on a peripheral area of the region where the guiding portions 26 and the holding portions 27 are disposed (in a manner surrounding the pair of the guiding portions 26 and the pair of the holding portions 27). This increases the rigidity of the second support member 20 in the region where the guiding portions 26 and the holding portions 27 are formed while decreasing the rigidity of the second support member 20 outside the region. Thus, the region where the second support member 20 is easy to be bent and the region where the second support member 20 is difficult to be bent are both formed to improve the seating comfort of the vehicle seat 1 while strongly holding the blower 30.

While the above-described embodiment describes a case where the pair of the protruding portions 24 are each formed on the front end side and the rear end side in the front-back direction of the second support member 20, the disclosure is not limited to this. For example, a configuration may be employed such that a protruding portion is additionally formed between the protruding portion 24 formed on the front end side of the second support member 20 and the protruding portion 24 formed on the rear end side (near the center in the front-back direction of the second support member 20), and the protruding portion is coupled to the second spring member 5. This prevents the coupling portion 25 from coming off from the second spring member 5 even when the load of the seated person applies on the proximity of the center in the front-back direction of the second support member 20.

That is, when the load of the seated person applies on the proximity of the center in the front-back direction of the second support member 20, the proximity of the center of the second support member 20 curves downward (far-side in the direction perpendicular to the paper surface of FIG. 5A), and the front end side and the rear end side of the second support member 20 deform in a posture downwardly inclining to the center side in the front-back direction of the second support member 20. In this case, the coupling portions 25 formed on the front end side and the rear end side of the second support member 20 are formed into a C shape in a cross-sectional view (the coupling portion 25 formed as a pair of protrusions sandwiches the second spring member 5), thus the coupling portion 25 easily comes off from the second spring member 5.

In contrast, the protruding portion additionally formed between the protruding portion 24 formed on the front end side of the second support member 20 and the protruding portion 24 formed on the rear end side inhibits the proximity of the center of the second support member 20 from curving downward (far-side in the direction perpendicular to the paper surface of FIG. 5A) when the load of the seated person applies on the proximity of the center in the front-back direction of the second support member 20. Accordingly, even when the coupling portion 25 is formed into the C shape in the cross-sectional view, the coupling portion 25 is prevented from coming off from the second spring member 5.

While the above-described embodiment describes a case where the coupling portion 25 is formed into the C shape in the cross-sectional view, the disclosure is not limited to this. For example, of the pair of the protrusions on the coupling portion 25, the protrusion on the outer side in the lateral direction of the second support member 20 (outer side in the lateral direction of FIG. 5B) may be formed longer than the protrusion on the inner side.

The pair of the protrusions on the coupling portion 25 may be formed into a flat plate shape (U shape in the cross-sectional view), and of the pair of the protrusions, the protrusion on the outer side in the lateral direction of the second support member 20 may be formed longer than the protrusion on the inner side (formed to have a long projection length from the second support member 20).

Of the pair of the protrusions on the coupling portion 25, the protrusion on the inner side in the lateral direction of the second support member 20 may be omitted. In this case, the protrusion on the outer side in the lateral direction of the second support member 20 is preferred to be formed into an L shape in the cross-sectional view (L shape bent inward in the lateral direction of the second support member 20).

Thus, with the pair of the protrusions on the coupling portion 25 of which the protrusion on the outer side in the lateral direction of the second support member 20 (outer side in the lateral direction of FIG. 5B) is formed longer than the protrusion on the inner side, or with the pair of the protrusions on the coupling portion 25 of which the protrusion on the outer side in the lateral direction of the second support member 20 is formed into the L shape in the cross-sectional view, the coupling portion 25 is prevented from coming off from the second spring member 5 even when the coupling portion 25 rotates around the second spring member 5.

While the above-described embodiment describes a case where the depressed groove 34 of the blower 30 includes the rubber portion 35, the disclosure is not limited to this. For example, the rubber portion 35 of the blower 30 may be omitted. In this case, a configuration may be employed such that the guiding portion 26 (the bent portion 26b) of the second support member 20 is formed into a shape corresponding to the depressed groove 34 of the blower 30, and the depressed groove 34 is fitted to the guiding portion 26 to be slid, thus slidably moving the blower 30 with respect to the guiding portion 26.

In this case, preferably, sliding parts (facing surfaces in the lateral direction of the second support member 20 (lateral direction of FIG. 7)) of the guiding portion 26 and the blower 30 include a hemispherical protrusion and a hemispherical depression that cause the guiding portion 26 and the blower 30 to be fitted to one another. This causes the protrusion and the depression to be fitted to one another, thus preventing the blower 30 from slidably moving in the direction in which the blower 30 is pulled out of the guiding portion 26.

While the above-described embodiment describes a case where the blower 30 includes the depressed groove 34 (the rubber portion 35) and the bent portion 26b of the guiding portion 26 is fitted to the depressed groove 34, the disclosure is not limited to this. For example, a configuration may be employed such that protrusions are disposed to extend along the outer periphery of the blower 30, depressed grooves having shapes corresponding to the protrusions are formed on the guiding portion 26, and the protrusion formed on the blower 30 is fitted to the depressed groove formed on the guiding portion 26, thus sliding the blower 30 with respect to the guiding portion 26.

The invention claimed is:

1. A vehicle seat comprising:
a frame forming a frame of a seat back or a seat cushion;
a cushion member disposed on the frame;
a plurality of spring members for supporting the cushion member;
a blower unit including a blower and a duct, the duct being coupled to the blower; and
a support member that causes the spring members to support the blower unit, wherein
the plurality of the spring members is each disposed to bridge between the frame and the support member,
the blower unit is disposed on an opposite side to the cushion member side on the support member,
the support member is made of resin material and formed into a flat plate shape, and
the support member includes a protruding portion and a coupling portion, the protruding portion is formed projecting to the spring member side from an outer edge of the support member, and the coupling portion is formed on a projecting end side of the protruding portion and rotatably coupled to an outer peripheral surface of the spring member.

2. The vehicle seat according to claim 1, wherein
the support member includes an opening portion opened passing through in a thickness direction of the support member, and
the opening portion holds an end portion of the duct on an opening side of the duct.

3. The vehicle seat according to claim 2, wherein
the duct includes a flange portion that projects out into a flange shape from a distal end on the opening side of the duct, and the flange portion is locked to the opening portion, and
the flange portion is disposed on the cushion member side on the support member.

4. A vehicle seat comprising:
a frame forming a frame of a seat back or a seat cushion;
a cushion member disposed on the frame;
a plurality of spring members for supporting the cushion member;
a blower unit including a blower and a duct, the duct being coupled to the blower; and
a support member that causes the spring members to support the blower unit, wherein
the plurality of the spring members is each disposed to bridge between the frame and the support member,
the blower unit is disposed on an opposite side to the cushion member side on the support member,
the support member is made of resin material and formed into a flat plate shape,
the support member includes a pair of guiding portions that are disposed upright on a surface of an opposite side to the cushion member, and the pair of guiding portions are disposed to extend on a straight line,
the blower includes a sliding portion configured to be slidably movable with respect to the pair of the guiding portions, and
at least one of the support member and the blower includes first restricting portion that restricts the slide move of the blower in a direction in which the blower is inserted between the pair of the guiding portions.

5. The vehicle seat according to claim 4, wherein
at least one of the support member and the blower includes second restricting portion that restricts the slide move of the blower in a direction in which the blower is pulled out of the pair of the guiding portions.

6. The vehicle seat according to claim 4, wherein
the pair of the guiding portions are intermittently formed along an extending direction of the pair of the guiding portions.

7. The vehicle seat according to claim 4, wherein
at least one of the pair of the guiding portions and the blower includes a rubber elastic body interposed between the pair of the guiding portions and the sliding portion.

8. The vehicle seat according to claim 4, wherein
the support member includes a slit portion formed to be depressed or pass through in a thickness direction of the support member.

9. The vehicle seat according to claim 8, wherein
the slit portion is formed on an outer edge side of the support member with respect to a region where the pair of the guiding portions are disposed.

10. The vehicle seat according to claim 8, wherein
the slit portion is formed in a region surrounded by the pair of the guiding portions.

11. The vehicle seat according to claim 10, wherein the blower is disposed separately from the support member.

\* \* \* \* \*